US012611029B2

(12) United States Patent
Ingram

(10) Patent No.: US 12,611,029 B2
(45) Date of Patent: Apr. 28, 2026

(54) PAINTBRUSH CLEANING TOOL

(71) Applicant: Shawn L. Ingram, Bozeman, MT (US)

(72) Inventor: Shawn L. Ingram, Bozeman, MT (US)

( * ) Notice: Subject to any disclaimer, the term of this patent is extended or adjusted under 35 U.S.C. 154(b) by 410 days.

(21) Appl. No.: 18/313,979

(22) Filed: May 8, 2023

(65) Prior Publication Data

US 2023/0354994 A1 Nov. 9, 2023

Related U.S. Application Data

(60) Provisional application No. 63/339,301, filed on May 6, 2022.

(51) Int. Cl.
*A46B 17/06* (2006.01)
*B44D 3/00* (2006.01)

(52) U.S. Cl.
CPC .............. *A46B 17/06* (2013.01); *B44D 3/006* (2013.01)

(58) Field of Classification Search
CPC ................................ A46B 17/06; B44D 3/006
See application file for complete search history.

(56) References Cited

U.S. PATENT DOCUMENTS 8,276,605 B2 * 10/2012 Heathcote .............. B01D 29/21 210/791

* cited by examiner

*Primary Examiner* — Shay Karls
(74) *Attorney, Agent, or Firm* — Kilpatrick Townsend & Stockton LLP; Torrey D. Spink

(57) ABSTRACT

Paintbrush cleaning tools are provided that include a tool body having a first surface and a second surface opposite the first surface. The tool body may define an inlet port on a first end and a plurality of outlet ports on a second end opposite the first end. The inlet port may be configured to couple with a hose. The tool body may define at least one channel that fluidly couples the inlet port with the plurality of outlet ports. Each of the first surface and the second surface may include a plurality of teeth that extend outward from the respective surface of the tool body. Each of the first surface second surface may include a plurality of ridges that extend along at least a portion of a length of the respective surface.

20 Claims, 5 Drawing Sheets

PAINTBRUSH CLEANING TOOL

CROSS REFERENCE TO RELATED APPLICATION

This application claims the benefit of U.S. Provisional Application No. 63/339,301, filed May 6, 2022, and titled "PAINTBRUSH CLEANING TOOL", the contents of which are incorporated herein by reference in the entirety.

BACKGROUND

Current products for cleaning paintbrushes often fail to adequately clean individual bristles. For example, some current devices utilize liquids, such as water, to spray and/or otherwise rinse the bristles. However, typically these devices fail to adequately remove paint along an entire length of the bristle, especially in regions near the brush head. Other devices include combs that are designed to strip paint from in-between the bristles. However, such devices may struggle to remove all of the paint, especially without the use of water or other solvents. Additionally, conventional cleaning tools may damage the bristles and render the paintbrush unsuitable for further use. Therefore improvements in the area of paintbrush cleaning implements are desired.

BRIEF SUMMARY

Embodiments of the present invention are directed to paintbrush cleaning tools that more effectively remove paint from paintbrushes without damaging the bristles. More particularly, embodiments are directed to paintbrush cleaning tools that are attachable to water sources, such as hoses and/or faucets to supply a controlled flow of water to a paintbrush. Embodiments also include a number of spiked protrusions and/or ridges that help separate the bristles to enable water flow to better penetrate deep within the bristles.

Some embodiments of the present technology may encompass paintbrush cleaning tools. The paintbrush cleaning tools may include a tool body having a first surface and a second surface opposite the first surface. The tool body may define an inlet port on a first end and a plurality of outlet ports on a second end opposite the first end. The inlet port may be configured to couple with a hose. The tool body may define at least one channel that fluidly couples the inlet port with the plurality of outlet ports. Each of the first surface and the second surface may include a plurality of teeth that extend outward from the respective surface of the tool body. Each of the first surface second surface may include a plurality of ridges that extend along at least a portion of a length of the respective surface.

In some embodiments, each of the plurality of ridges is disposed proximate the second end of the tool body. Each of the plurality of ridges may separate two adjacent outlet ports of the plurality of outlet ports. Each plurality of outlet ports may be arranged along a width of the second end of the tool body. The plurality of teeth may be arranged in multiple rows. The teeth in each row may be staggered relative to teeth in an adjacent row. A thickness of the tool body may decrease in a direction of the first end.

Some embodiments of the present technology may encompass paintbrush cleaning tools that include a tool body having a first surface and a second surface opposite the first surface. The tool body may define an inlet port on a first end and a plurality of outlet ports on a second end opposite the first end. The tool body may define at least one channel that fluidly couples the inlet port with the plurality of outlet ports. The first surface may include a plurality of teeth that extend outward from the first surface. The first surface may include a plurality of ridges that extend along at least a portion of a length of the first surface.

In some embodiments, a height of each of the plurality of ridges may increase along a length of the respective ridge in a direction from the first end to the second end. The inlet port may include threads that are configured to engage with a hose. The second surface may include one or both of an additional plurality of ridges and an additional plurality of teeth. The plurality of ridges may be parallel to a longitudinal axis of the tool body. The plurality of ridges may wrap around the first end of the tool body so as to extend continuously from the first surface to the second surface. Each of the plurality of outlet ports may be oriented to emit water in a direction that is substantially parallel with a longitudinal axis of the tool body.

Some embodiments of the present technology may encompass paintbrush cleaning tools that include a tool body having a first surface and a second surface opposite the first surface. The tool body may define an inlet port on a first end and a plurality of outlet ports on a second end opposite the first end. The tool body may define at least one channel that fluidly couples the inlet port with the plurality of outlet ports. The first surface may include a plurality of teeth that extend outward from the first surface. The first surface may include a plurality of ridges that extend along at least a portion of length of the first surface.

In some embodiments, the tool body may have a thickness of less than about 0.75 inches at the first end. Each of the plurality of teeth may have a height of at least about 0.25 inches. The plurality of outlet ports may span a lateral distance that is greater than a width of the inlet port. The tool body may widen along a length of the tool body in a direction from the first end to the second end. The plurality of teeth may be positioned within a medial region of the tool body.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the present invention are directed to devices for cleaning paintbrushes. In particular, embodiments are directed to attachments for fluid flow devices, such as hoses, faucets, and/or other fluid delivery sources that may be used to clean paint, stain, and/or other substances from the bristles and/or other application surfaces of a paintbrush or other applicator. Embodiments may enable the brushes to be cleaned thoroughly without damaging the bristles, which may enable the lifespan of the paintbrushes to be increased. In addition, embodiments according to the present technology provide for robust cleaning of the base of one or more bristles, allowing for more even cleaning over one or more regions of a respective bristle or a plurality of bristles. While discussed primarily in the context of a tool for cleaning paintbrushes, it will be appreciated that the invention is not so limited and can be utilized to clean and/or deliver fluid to any number of objects.

Figure 1A:
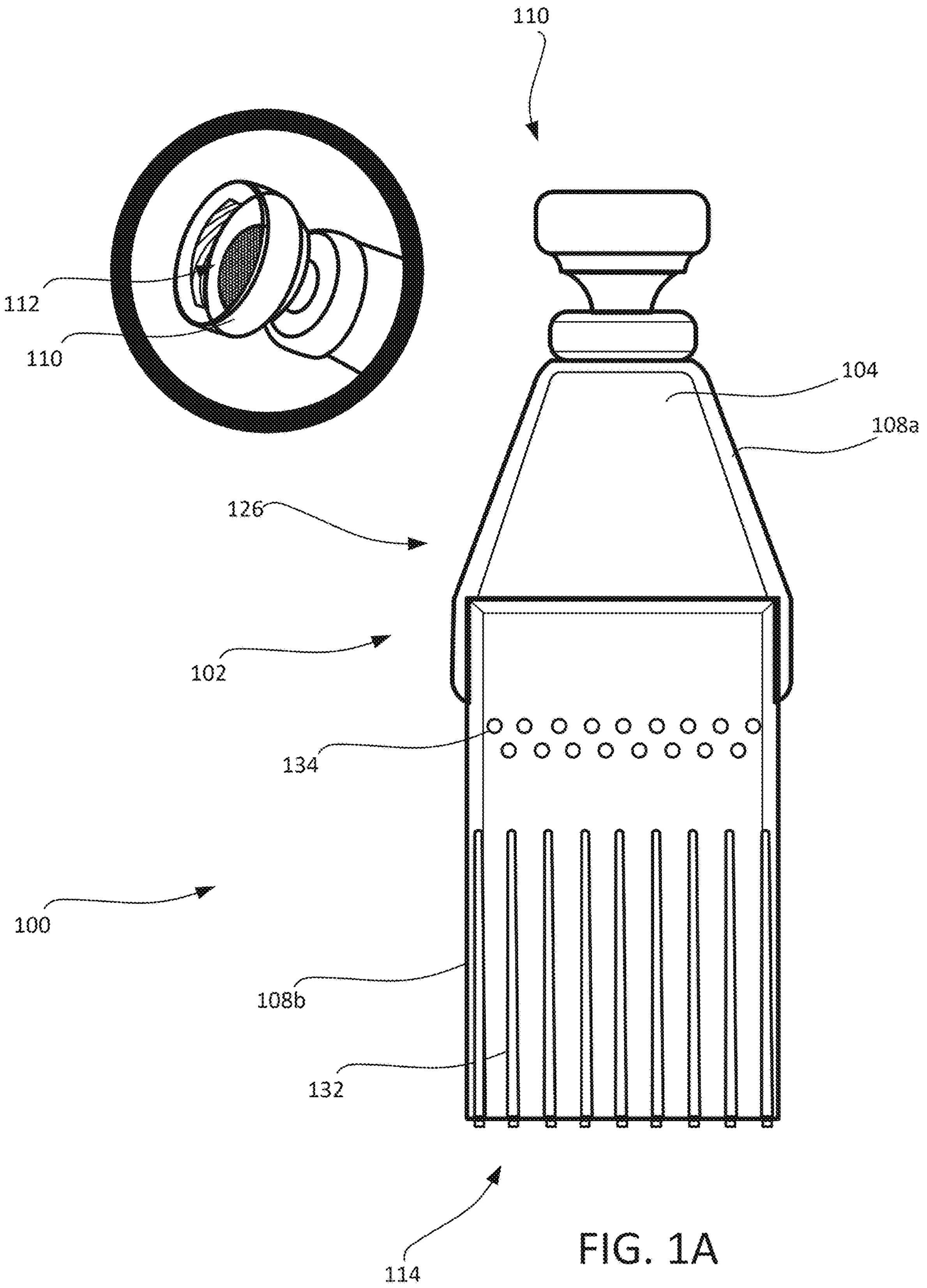
FIG. 1A illustrates a top plan view of a paintbrush cleaning tool according to embodiments of the present invention.
Figure 1B:
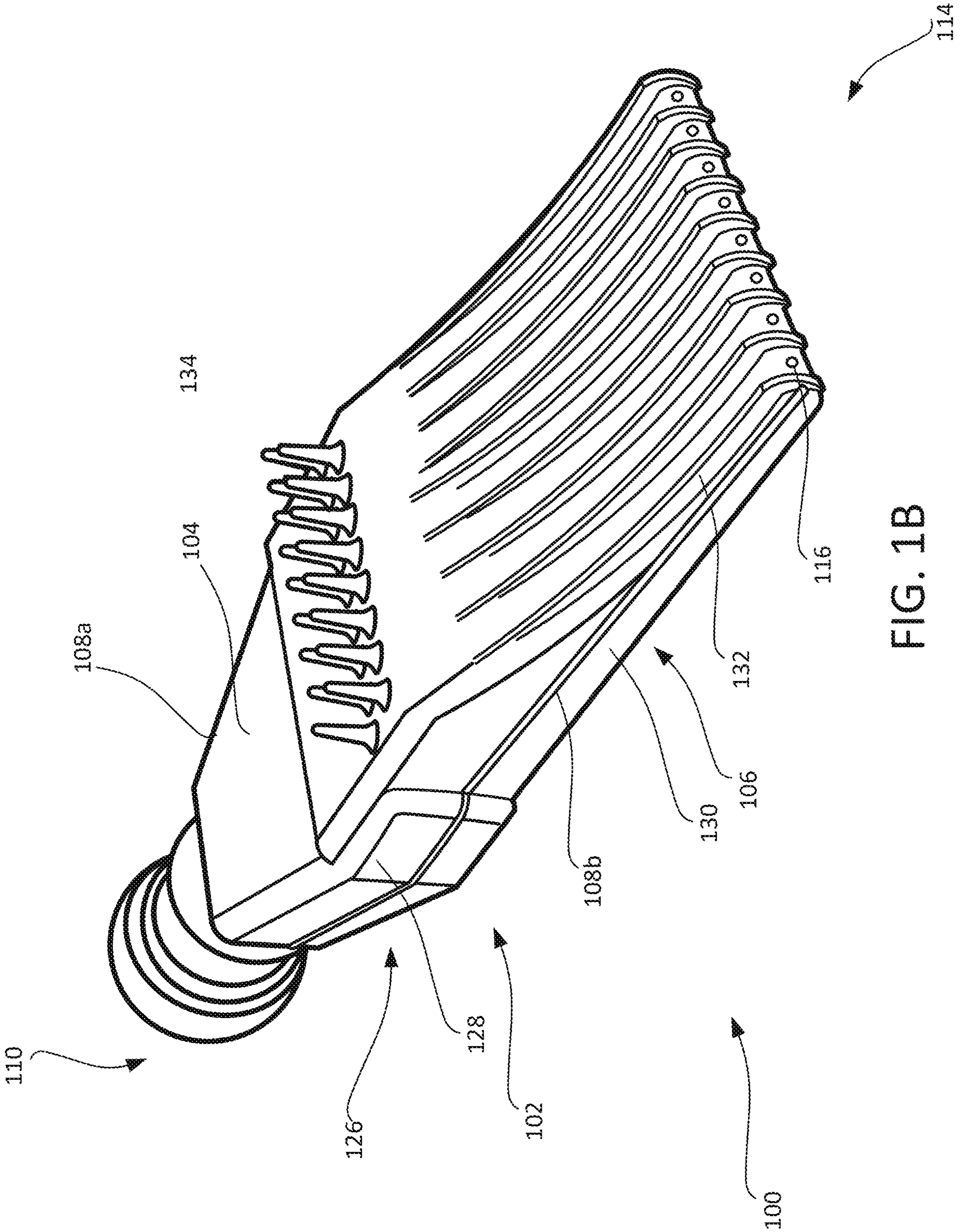
FIG. 1B illustrates an isometric view of the paintbrush cleaning tool of FIG. 1A.
Figure 1C:
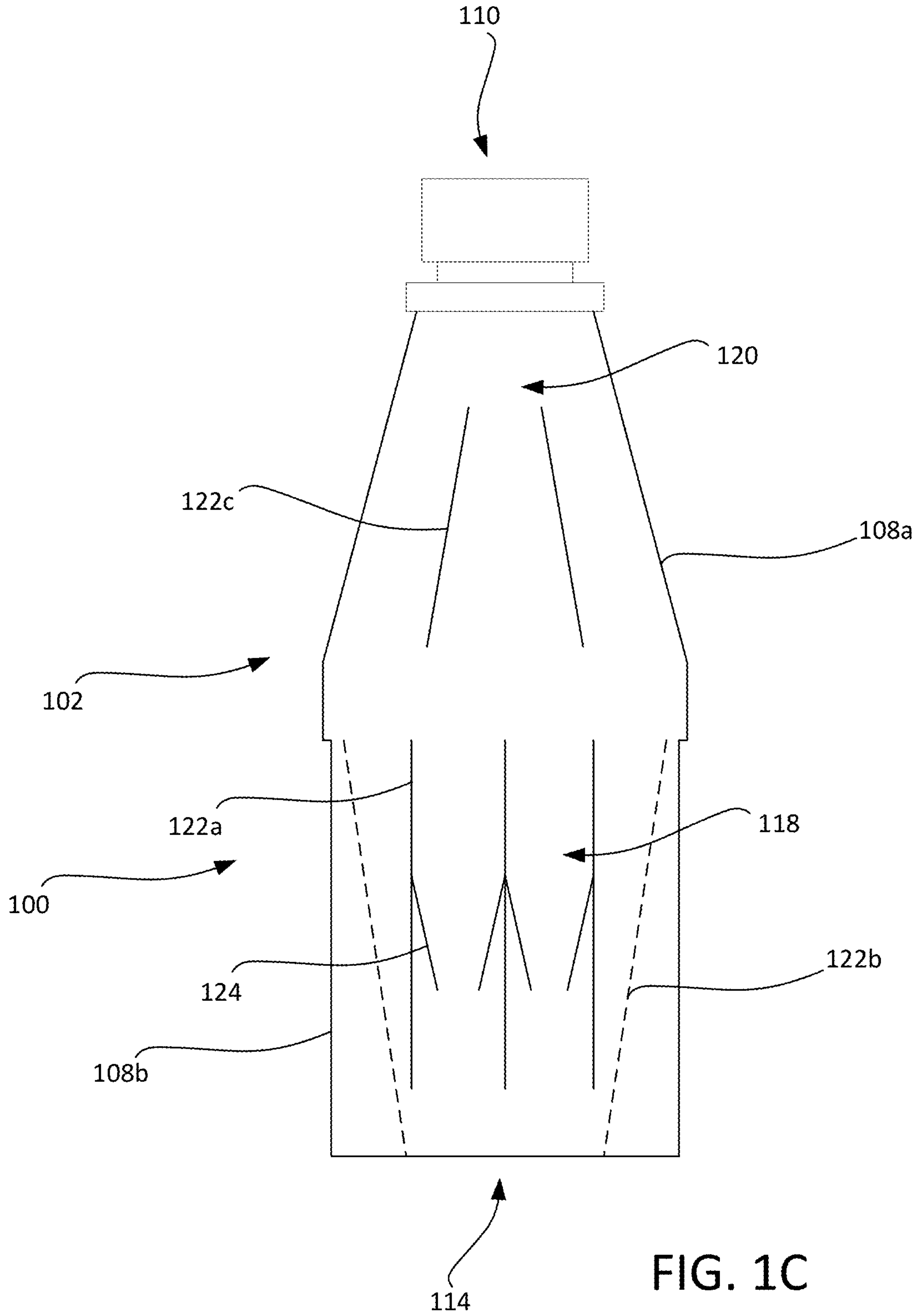
FIG. 1C illustrates a cross-sectional top view of the paintbrush cleaning tool of FIG. 1A.

Turning now to FIGS. 1A-1C, one embodiment of a paintbrush cleaning tool 100 is illustrated. Tool 100 may include a tool body 102, which may include a first surface 104 and a second surface 106 positioned opposite the first surface 104. Sidewalls 108*a* and 108*b* may extend between and couple the first surface 104 and the second surface 106 in some embodiments. For example, the sidewalls 108*a* and 108*b* may be generally orthogonal (or at another angle) relative to the first surface 104 and/or the second surface 106 to join the first and second surfaces to form a three-dimensional tool body 102. For example, the first surface 104 and/or second surface 106 may be generally planar along a width of the tool body 102 at any point along a length of the tool body 102, with the first surface 104 and the second surface 106 being spaced apart from one another to define a partially hollow or open interior. However, as will be discussed in greater detail below, in embodiments, the first surface 104 and/or second surface 106 may taper towards one another moving from a first inlet end 110 towards a second outlet end 114. In other embodiments, rather than including sidewalls 108*a* and 108*b*, edges of the first surface 104 and/or second surface 106 may taper toward the other surface such that edges of the opposing surfaces are joined, while leaving a medial portion of the surfaces spaced apart to define the open interior.

The tool body 102 may include a first inlet end 110 that defines an inlet port 112 and a second outlet end 114 that is spaced apart from the inlet end 110 along a length of the tool body 102. The outlet end 114 may define a plurality of outlet ports 116 that may be fluidly coupled with the inlet port 112. In some embodiments, the inlet port 112 may be configured to couple with a fluid delivery source, such as via a faucet, hose, and/or other mechanism. For example, the inlet port 112 may define a collar and/or other female connector that may receive a hose and/or faucet fitting. The connector may include internal threading that may engage corresponding threads of the fluid delivery source fitting. In other embodiments, the inlet port 112 may define a male connector that may engage with a corresponding female connector of the fluid delivery source.

The outlet ports 116 may be spaced apart from one another along a width of the outlet end, at regular and/or irregular intervals. In some embodiments, the outlet ports 116 may span a lateral distance that is greater than a width of the inlet port 112. The outlet ports 116 may have circular cross-sections or may have any other shape of cross-section. The outlet ports 116 may each have a diameter (or other largest lateral dimension) of between about 0.005 inches and 0.125 inches, such as greater than or about 0.001 inches, such as greater than or about 0.005 inches, such as greater than or about 0.01 inches, such as greater than or about 0.05 inches, such as greater than or about 0.1 inches, such as up to about 0.125 inches, or any ranges or values therebetween. In some embodiments, the collective open area of the outlet ports 116 may be smaller than a cross-sectional area of the inlet port 112, which may enable fluid to exit the outlet ports 116 at a greater velocity than the fluid enters the inlet port 112. In some embodiments, the inlet port 112 and/or outlet ports 116 may include adjustable nozzles that enable a size of the respective opening to be adjusted to control the flow rate and/or pressure through the respective opening. While illustrated with a single linear row of outlet ports 116, it will be appreciated that the outlet ports 116 may be arranged in multiple rows and/or in non-linear arrangements. The outlet ports 116 may be oriented to emit water or other fluid in a direction that is substantially parallel with a longitudinal axis of the tool body 102. Tool body 102 may define at least or about four outlet ports, at least or about five outlet ports, at least or about six outlet ports, at least or about seven outlet ports, at least or about eight outlet ports, at least or about nine outlet ports, at least or about ten outlet ports, or more.

As noted above, the inlet port 112 and the outlet ports 116 may be fluidly coupled with one another. For example, as illustrated in the cross-sectional view of FIG. 1C, the interior of the tool body 102 may define a number of channels 118 that divide at least a portion of the interior of the tool body 102 into a number of separate fluid paths. The channels 118 may extend from the outlet end 114 toward the inlet end 110, where the channels may be joined at a plenum 120. The channels 118 may be defined by a number of ribs 122*a* that extend between and couple the first surface 104 and the second surface 106. In some embodiments, some or all of the ribs 122 may be generally parallel with the length of the tool body 102, while in other embodiments at least some of the ribs 122 may taper inward or outward, which may direct the water to the outlet ports 116 and/or may control a pressure of the fluid exiting the tool body 102. For example, ribs 122*b* that taper inward (e.g., decrease the flow volume) may increase the pressure of the fluid, while ribs 122 that taper outward (e.g., increase the flow volume) may decrease the pressure of the fluid. In some embodiments, additional ribs 122*c* may be provided in or near the plenum 120. These ribs 122*c* may help stabilize and strengthen the tool body 102 and, in some embodiments, may be substantially parallel to sidewalls 108*a* and 108*b*. In some embodiments, additional ribs and/or other features to increase the pressure of the fluid may be provided within the interior of the tool body 102. For example, pressure ribs 124 may be provided that taper inward and/or outward in the downstream direction to increase or decrease the fluid pressure exiting the outlet ports 116. As illustrated, pressure ribs 124 may extend outward from one or more of the ribs 122*a* (or other ribs 122) to alter the flow path within the interior and to adjust the fluid pressure. For example, as shown pressure ribs 124 extend laterally outward and form an acute angle with the downstream portion of ribs 122*a*, without contacting an adjacent rib 122*a* such that a fluid path is present between each adjacent rib 122*a*.

It will be appreciated that the arrangement of the various ribs shown in FIG. 1C is merely representative of one particular embodiment and that numerous rib configurations exist to meet the needs of different applications.

Figure 2:
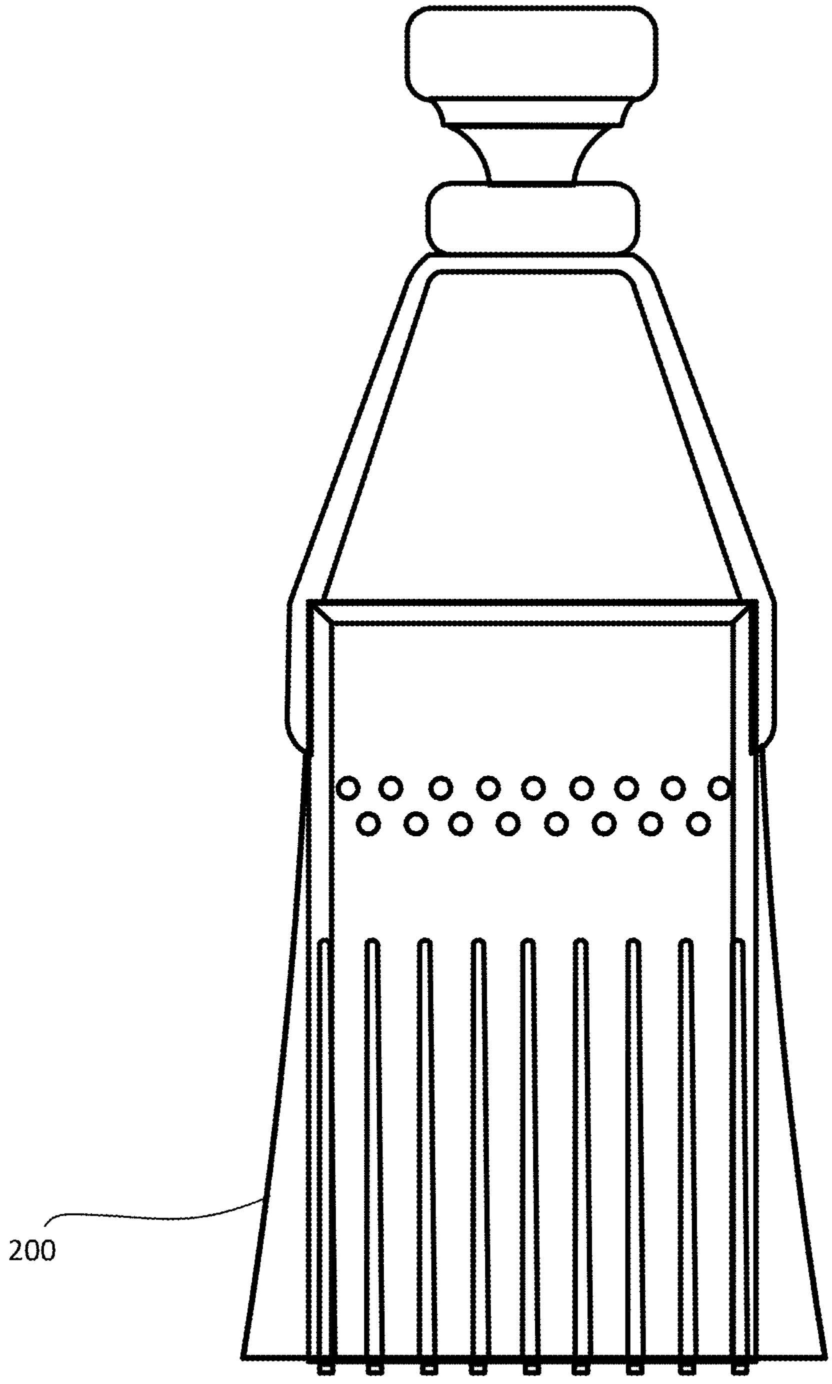
FIG. 2 illustrates a top plan view of a paintbrush cleaning tool according to embodiments of the present invention.

In some embodiments, each of the first surface 104 and the second surface 106 is characterized by a generally hexagonal shape. For example, as best illustrated in FIG. 1A, the inlet end 110 may couple with sidewalls 108*a* that taper outward toward a medial region 126 of the tool body 102, where sidewalls 108*a* join with generally parallel sidewalls 108*b* that extend to the outlet end 114. In other words, a width of the tool body 102 may increase along all or part of a length of the tool body 102 in a direction of the outlet end 114. In some embodiments, the sidewalls 108*b* may include flared portion 200 that tapers outward toward the outlet end 114, as illustrated in FIG. 2. In yet other embodiments, the width of the tool body 102 may decrease along all or part of a length of the tool body 102 in a direction of the outlet end 114, which may enable the tool body 102 to better match the size of smaller brushes. For instance, while not shown, in embodiments, sidewalls 108*b* may mirror ribs 122*b*, forming a narrowing taper towards second end 114.

In some embodiments, a thickness of the tool body 102 may be constant along the length of the tool body 102. In other embodiments, the thickness may vary along the length of the tool body 102. For example, as best illustrated in FIG. 1B, at least a portion of the tool body 102 may taper from a thicker region proximate the inlet end 110 to a thinner region proximate the outlet end 114. The taper may be at a constant angle, may include multiple linear and/or curved tapers, and/or may include a single contour of a constant and/or varying radius. For example, all or a portion of the sidewalls 108*a* and 108*b* may taper on a first surface-side 128 and/or a second surface side 130 of the sidewall 108*a* and 108*b* such that a thickness or distance between the first surface 104 and/or second surface 106 taper along at least a portion of the length of the tool body 102. In some embodiments, the taper may start in the medial region 126 and may continue until contacting the outlet end 114 and/or proximate the outlet end 114. In some embodiments, a thickness of the tool body may be less than about 0.75 inches at the outlet end 114, less than about 0.5 inches, less than about 0.25 inches, less than about 0.15 inches, or less. Such thicknesses at the outlet end 114 may enable the medial region 126 and/or outlet end 114 to be inserted within the bristles of a paintbrush to better remove paint from the interior bristles of the brush. The tapered design may help facilitate insertion of the tool body 102 into the brush and may help minimize any bending or other damage to the bristles during cleaning of the brush.

In some embodiments, exterior surfaces of the first surface 104 and/or second surface 106 may include a number of ridges 132 that extend along at least a portion of a length of the respective surface of the tool body 102. For example the ridges 132 may protrude outward from the exterior surface from or proximate the outlet end 114 and may extend toward the inlet end 110. The ridges 132 may terminate within the medial region 126 in some embodiments. The ridges 132 may extend along all or a portion of the tapered section of the tool body 102. Each ridge 132 may have a constant or variable height relative to the exterior surface from which it protrudes. For example, as illustrated, each ridge 132 has a maximum height at the outlet end 114, with the height gradually reducing until the ridge 132 is coplanar with the exterior surface of the tool body 102 within the medial region 126. In other words, a height of each ridge 132 increases along a length of the ridge 132 in a direction moving from the medial region 126 towards the outlet end 114. Oftentimes, the ridges 132 may run parallel to the length of the tool body 102, which may help facilitate the insertion of the tool body 102 into the bristles of a brush. In some embodiments, some or all of the ridges 132 may terminate on a distal end of the respective surface proximate the outlet end 114, while in other embodiments, some or all of the ridges 132 may wrap around or otherwise extend to the outlet end 114. For example, the ridges 132 may be provided continuously along one of the exterior surfaces of the tool body 102 and onto the outlet end 114. In some embodiments in which the ridges 132 are provided on both the first surface 104 and the second surface 106, the ridges 132 may wrap around or otherwise extend continuously along the first surface 104, outlet end 114, and second surface 106. Some or all of the ridges 132 may separate adjacent outlet ports 116. In other embodiments, multiple (or no) outlet ports 116 may be disposed between adjacent ridges 132.

In some embodiments, exterior surfaces of the first surface 104 and/or second surface 106 may include a number of teeth 134 that may extend outward from the respective surface of the tool body 102. For example, a number of teeth 134 may be provided within the medial region 126. In some embodiments, the teeth 134 may be provided between the inlet end 110 and the ridges 132. The teeth 134 may be disposed within a planar section of the first and/or second surface as shown and/or may be provided within a tapering section of the first and/or second surface. The teeth 134 may be arranged in one or more rows along a width of the tool body 102, with the teeth 134 in a given row being spaced apart from one another at regular or irregular intervals. In embodiments with multiple rows of teeth 134, the teeth 134 in adjacent rows may be aligned or staggered/offset relative to one another. In some embodiments, each row may have a same number of teeth 134, while in other embodiments one or more of the rows may have different numbers of teeth 134. Each of the teeth 134 may have a height of at least or about 0.25 inches, at least or about 0.375 inches, at least or about 0.5 inches, or more. The teeth 134 may be used to scrape paint and/or other material from the bristles of a brush.

In some embodiments, the first surface 104 and the second surface 106 may be identical such that the tool 100 is symmetrical. For example, each of the first surface 104 and the second surface 106 may include ridges 132 and/or teeth 134 in a similar arrangement. In other embodiments, the first surface 104 and the second surface 106 may be different from one another. For example, each of the first surface 104 and the second surface 106 may include ridges 132 and/or teeth 134, but the ridges 132 and/or teeth 134 may be in different arrangements. In other embodiments, one of the first surface 104 and the second surface 106 may be featureless. For example, the first surface 104 may include a number of ridges 132 and/or teeth 134 while the second surface 106 includes a generally flat, featureless exterior surface. In some embodiments, both surfaces may be tapered, while in other embodiments only a single surface is tapered. For example, as illustrated in FIG. 1B, the first surface 104 is tapered, while the second surface 106 is generally planar.

It will be appreciated that the tool bodies described above are merely examples, and that numerous variations in features, shapes, and sizes may exist. Additionally, the size of the tool body 102 and/or arrangement, size, number, and/or style of ribs 122, pressure ribs 124, ridges 132, and/or teeth 134 may vary depending on the needs of a particular application.

Nonetheless, in embodiments, the tool 100 may be formed as a single, monolithic piece, or may be two or more pieces joined together by a releasable or permanent attachment. In embodiments, the tool 100 may be molded, additively manufactured, or the like. Thus, in embodiments, regardless of the form or number of pieces, the tool 100 may be formed from a rigid or semi-rigid polymer, such as a plastic, in order to provide sufficient strength and structure to tool 100. In addition, in embodiments, the material forming all or a portion of tool 100 may be inert to solvents and stripping agents, such as solvents and stripping agents utilized to clean paint, thin paint, or clean paintbrushes. Thus, in embodiments, the tool 100 may be formed from polyethylene, including high-density polyethylene, polypropylene, polystyrene, polyethylene terephthalate, a thermoplastic elastomer, a urethane, a nylon, a polyoxymethylene, acrylonitrile butadiene styrene, a polycarbonate, or combinations thereof.

Figure 3:
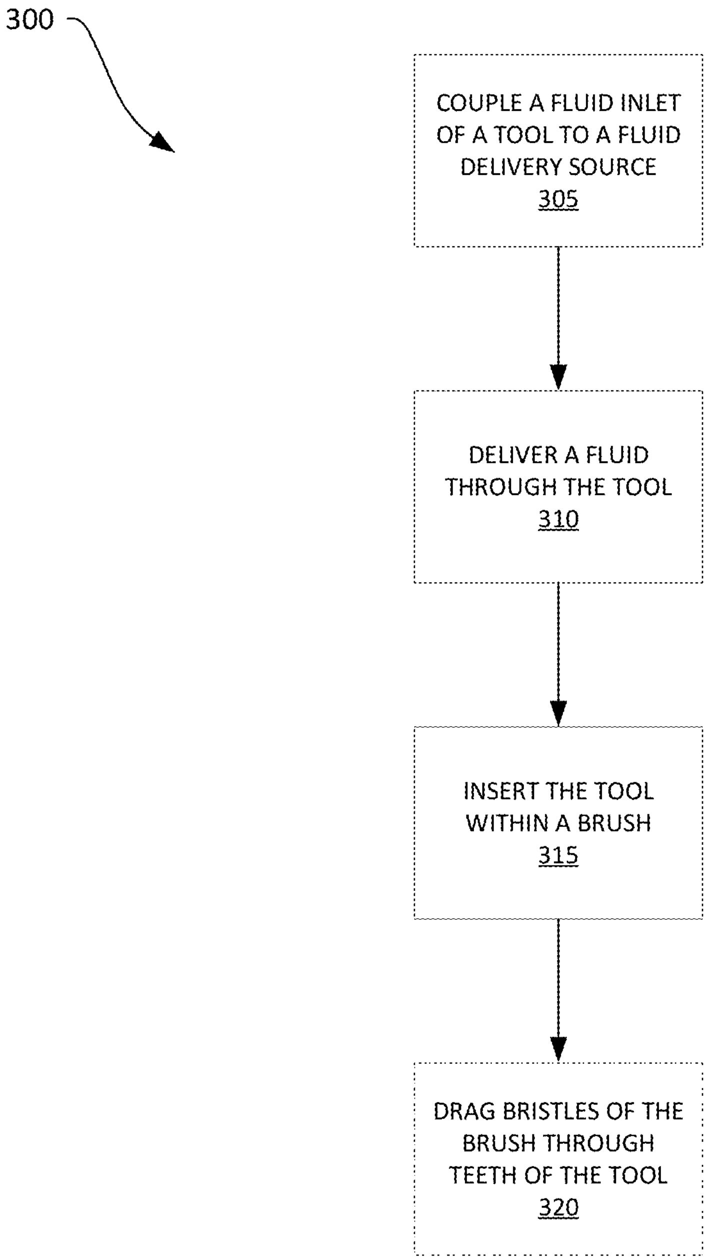
FIG. 3 illustrates operations of a method for cleaning a brush according to embodiments of the present invention.

FIG. 3 illustrates a flowchart showing the operations of a method 300 of cleaning a brush according to one embodiment of the present invention. Method 300 may be performed using a paintbrush cleaning tool, such as tool 100 described herein. Method 300 may begin at operation 305 by fluidly coupling an inlet port (such as inlet port 112) of the tool to a fluid delivery source, such as a hose, faucet, spigot, etc. Fluid, such as water or another solvent, may be delivered into a tool body of the tool via the inlet port, and may be ejected from the tool body at an increased flow rate and/or pressure at operation 310. For example, the fluid may be ejected from a number of outlet ports (such as outlet ports 116) defined within the tool body. The tool may be inserted within the bristles of a brush at operation 315. This may enable the fluid to be delivered deep in the belly of the brush, between the bristles, and toward a heel/ferrule of the brush and/or into the base of the bristles. The fluid may flush any paint, stain, powder, and/or other material out from the interior of the brush. In some embodiments, the method 300 may include dragging the bristles of the brush through a number of teeth (such as teeth 134) provided on an exterior surface of the tool at operation 320. This may help comb out any loose and/or dried paint to further clean the bristles of the brush.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A paintbrush cleaning tool, comprising:

a tool body having a first surface and a second surface opposite the first surface, wherein:

the tool body defines an inlet port on a first end and a plurality of outlet ports on a second end opposite the first end, the inlet port being configured to couple with a hose;

the tool body defines at least one channel that fluidly couples the inlet port with the plurality of outlet ports;

each of the first surface and the second surface comprise a plurality of teeth that extend outward from the respective surface of the tool body;

the tool body comprises a plurality of ridges;
each ridge of the plurality of ridges extends along the first surface, wraps around the second end, and extends along the second surface;
a first portion of each ridge of the plurality of ridges on the first surface protrudes away from the tool body in a first direction opposite the second surface;
a second portion of each ridge of the plurality of ridges on the second end protrudes away from the tool body in a second direction opposite the first end;
a third portion of each ridge of the plurality of ridges on the second surface protrudes away from the tool body in a third direction opposite the first surface; and
each outlet port of the plurality of outlet ports is disposed in low regions of the tool body formed between adjacent ridges of the plurality of ridges.

2. The paintbrush cleaning tool of claim 1, wherein:
the plurality of outlet ports are arranged along a width of the second end.

3. The paintbrush cleaning tool of claim 1, wherein:
the plurality of teeth are arranged in multiple rows.

4. The paintbrush cleaning tool of claim 3, wherein:
the teeth in each row are staggered relative to teeth in an adjacent row.

5. The paintbrush cleaning tool of claim 1, wherein:
a thickness of the tool body decreases in a direction from the first end toward the second end.

6. A paintbrush cleaning tool, comprising:
a tool body having a first surface and a second surface opposite the first surface, wherein:
the tool body defines an inlet port on a first end and a plurality of outlet ports on a second end opposite the first end;
the tool body defines at least one channel that fluidly couples the inlet port with the plurality of outlet ports;
the first surface comprises a plurality of teeth that extend outward from the first surface;
the tool body comprises a plurality of ridges;
each ridge of the plurality of ridges extends along the first surface, wraps around the second end, and extends along the second surface;
a first portion of each ridge of the plurality of ridges on the first surface protrudes away from the tool body in a first direction opposite the second surface;
a second portion of each ridge of the plurality of ridges on the second end protrudes away from the tool body in a second direction opposite the first end;
a third portion of each ridge of the plurality of ridges on the second surface protrudes away from the tool body in a third direction opposite the first surface; and
each outlet port of the plurality of outlet ports is disposed in low regions of the tool body formed between adjacent ridges of the plurality of ridges.

7. The paintbrush cleaning tool of claim 6, wherein:
a height of each ridge of the plurality of ridges increases along a length of the respective ridge in a direction from the first end towards the second end.

8. The paintbrush cleaning tool of claim 6, wherein:
the inlet port comprises threads that are configured to engage with a hose.

9. The paintbrush cleaning tool of claim 6, wherein:
the second surface comprises an additional plurality of teeth.

10. The paintbrush cleaning tool of claim 6, wherein:
the plurality of ridges are parallel to a longitudinal axis of the tool body.

11. The paintbrush cleaning tool of claim 6, wherein:
each of the plurality of outlet ports are oriented to emit water in a direction that is substantially parallel with a longitudinal axis of the tool body.

12. The paintbrush cleaning tool of claim 6, wherein:
the plurality of teeth are positioned within a medial region of the tool body.

13. The paintbrush cleaning tool of claim 6, wherein:
each tooth of the plurality of teeth comprises an elongate, pointed cylindrical projection having a height of at least 0.25 inches.

14. The paintbrush cleaning tool of claim 6, wherein:
a distance that each ridge of the plurality of ridges protrudes from the tool body in the first direction increases within the first portion as the ridge extends toward the second end; and
a distance that each ridge of the plurality of ridges protrudes from the tool body in the third direction increases within the third portion as the ridge extends toward the second end.

15. A paintbrush cleaning tool, comprising:
a tool body having a first surface and a second surface opposite the first surface, wherein:
the tool body defines an inlet port on a first end and a plurality of outlet ports on a second end opposite the first end;
the tool body defines at least one channel that fluidly couples the inlet port with the plurality of outlet ports;
the first surface comprises a plurality of teeth that extend outward from the first surface; and
the first surface comprises a plurality of ridges that extend along at least a portion of length of the first surface;
each ridge of the plurality of ridges on the first surface protrudes away from the tool body in a direction opposite the second surface;
a distance that each ridge of the plurality of ridges protrudes from the tool body in the direction opposite the second surface increases as the ridge extends toward the second end; and
a portion of the tool body occupied by the plurality of ridges decreases in thickness as the tool body extends to the second end such that the second end of the tool body forms a thinnest portion of the tool body.

16. The paintbrush cleaning tool of claim 15, wherein:
the tool body has a thickness of less than or about 0.75 inches at the first end.

17. The paintbrush cleaning tool of claim 15, wherein:
each of the plurality of teeth has a height of at least about 0.25 inches.

18. The paintbrush cleaning tool of claim 15, wherein:
the plurality of outlet ports span a lateral distance that is greater than a width of the inlet port.

19. The paintbrush cleaning tool of claim 15, wherein:
the tool body widens along a length of the tool body in a direction of the second end.

20. The paintbrush cleaning tool of claim 6, wherein:
the plurality of teeth are positioned proximate ends of the plurality of ridges and are configured to remove contaminants from bristles of a brush during cleaning operations.

* * * * *